Oct. 21, 1924.  
F. W. JURY  
GEAR CUTTER  
Filed Nov. 9, 1922  
1,512,543

Witness:  
R. E. Weber

Inventor:  
Frank W. Jury  
By  
Attorneys

Patented Oct. 21, 1924.

1,512,543

UNITED STATES PATENT OFFICE.

FRANK W. JURY, OF MILWAUKEE, WISCONSIN.

GEAR CUTTER.

Application filed November 9, 1922. Serial No. 599,799.

*To all whom it may concern:*

Be it known that I, FRANK W. JURY, a subject of Great Britain, and resident of Milwaukee, in the county of Milwaukee and State of Wisconsin, have invented certain new and useful Improvements in Gear Cutters; and I do hereby declare that the following is a full, clear, and exact description thereof.

This invention relates to cutters for use in forming spur gears, spiral and double helical or herring-bone gears.

Objects of this invention are to provide cutters which may be used in machines of the type disclosed in Patent No. 1,456,240 issued to me May 22, 1923, for gear cutting machine or in fact, to provide cutters which may be used with any type of gear cutting machines in which the cutters are slantingly reciprocated and advance along a line tangential to the periphery of the slowly rotating blank.

Further objects are to provide cutters which will finish the apex of each tooth at the exact center line; which have sharp cutting edges on each side and at the top of each of the cutting teeth; and to provide cutters which are designed for a tangential feed while the gear blank rotates, to thereby partially cut all the teeth completely around the blank and gradually finish them to the exact contour desired in one operation or cycle of the machine.

Further objects are to provide cutters which may be easily produced, which are of strong and rugged formation, and which are so constructed as to have long life.

An embodiment of the invention is shown in the accompanying drawings, in which:—

Figure 1:
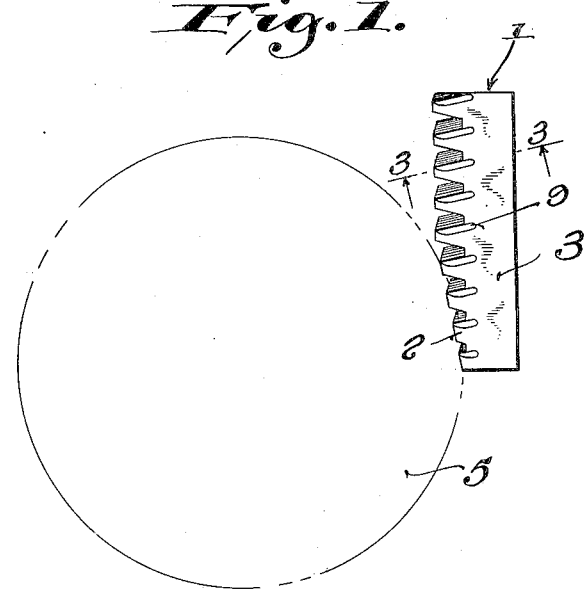
Figure 1 is a face view of a cutter showing its relative position to a gear blank, such blank being indicated in dotted lines.

This cutter, as stated, is designed to be used in a gear cutting machine in which the gear blank is slowly rotated upwardly towards the cutter while the cutter is moved downwardly tangentially and at the same time is reciprocated along a slanting line. It is understood that two cutters shall be used and that one shall reciprocate to the center plane of the double helical gear or herring-bone gear while the other cutter is at its outer position, as indicated in dotted lines in Figure 2. A machine of this general type is disclosed in my co-pending application identified above.

The cutters are duplicates except that one is a right hand cutter and the other a left hand cutter, and it will, therefore, be necessary to describe in detail only one cutter.

The cutter comprises a body portion 1 which is substantially rectangular in formation from which project a plurality of teeth 2. These teeth are the cutting teeth of the tool and are arranged slantingly to the front face 3 of the cutter corresponding to the angle of the teeth, as indicated in dotted lines at 4 in Figure 2. In the drawings this cutter is illustrated as moving tangentially in a downwardly vertical line with reference to the gear blank. It is understood, of course, that the cutter may move along any tangential line desired, but for convenience it will be recited in detail, as shown in the drawings, that is to say, as moving along a vertical tangential line with reference to the gear blank.

Figure 3:
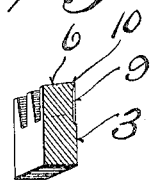
Figure 3 is a sectional view on the line 3—3 of Figure 2.

The lowest of the cutting teeth 2 are relatively short and are progressively longer as the upper portion of the cutter is approached, the uppermost teeth having the cutting edges of their tops lying in a line substantially parallel to the line joining the faces of the teeth. This upper face 6 of the teeth slopes backwardly away from the cutting face 3, as may be clearly seen from Figure 3.

Figure 2:
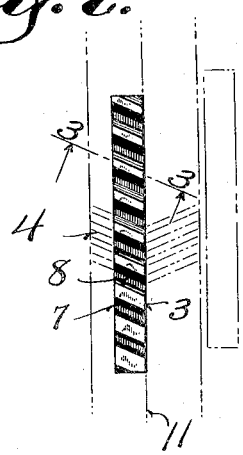
Figure 2 is a view looking directly at the teeth of the cutter from the front and showing in dotted lines the face of the gear blank with the cutter at its central position with reference to the blank and in dotted lines showing the second cutter in the position it assumes at this instant.

By referring to Figures 1 and 2, it will be seen that the face 7 of the teeth joins the face 3 of the cutter at an acute angle and therefore provides an acute cutting side edge for the teeth. The plane of the other side 8 of the teeth joins the face 3 at an obtuse angle. In order to provide an acute cutting edge for this corner of the cutting teeth a kerf 9 is cut out of the face of the tooth, as is most clearly shown in Figures 1 and 3. It is to be noted that this kerf joins the plane 8 at the line where such plane intersects the plane of the face 3 of the cutter. It is, also, to be noted that the outer end of this kerf dies away before it reaches the extreme top cutting edge or corner of the teeth so as to leave a straight top cutting edge 10 for each tooth.

It is to be noted, therefore, that the side cutting edges are straight-lined throughout their extent and that the top cutting edge is also a straight line. It is also to be noted that all of these lines lie in the same plane, that is to say, in the plane of the face 3 of the cutter.

With a cutter of this type it is possible to utilize a machine which reciprocates the cutter to the exact central plane 11 (see Figure 2) of the gear blank without marring the apex of the teeth. It is also possible to alternately reciprocate cutters first from one side and then from the other side of the gear blank, stopping each cutter at the exact center line, the cutters occupying the relative positions, as indicated in full and dotted lines in Figure 2.

As will be more fully understood from reference to my previously identified application, these cutters are adapted to be reciprocated along slanting lines while the gear blank slowly rotates upwardly past the cutter. At the same time the cutters are slowly fed downwardly, the teeth are gradually increasing in length, permitting this direct downwardly tangential feed. It is to be noted that the gear blank executes several complete rotations before the uppermost or finishing teeth of the cutter are brought into action. In this manner the teeth are partially formed completely around the gear without finishing any one tooth before the other teeth are cut out. It will, therefore, be seen that cutters constructed, as outlined in this application, are particularly adapted for this manner of forming gears and will, therefore, produce gears which are not warped, due to sudden relief of internal strain at any one point, but will produce gears in which the exact contour of each tooth in the gear is maintained throughout the entire extent of the gear.

It may be further pointed out that from actual practice it has been found that completely finishing one tooth at a time in a gear blank produces a warping effect upon the blank, due, as pointed out above, to the relief at one point only of the internal stresses so that the gear blank changes its contour. Further than this, when it is remembered that one tooth alone is completely finished before the next tooth is started, it becomes apparent that the wear upon the cutting tool, before such cutting tool arrives at the last tooth, is enormous. For this reason, it is apparent that the last tooth will not have the same contour as the first tooth. From actual tests conducted with gear cutting machines which completely form one tooth at a time, it has been found that the final teeth are different in contour from the first teeth cut and that the blank has assumed an oval or warped shape.

It will be seen from the disclosure made in this application that a gear cutter has been provided which wholly avoids these defects and which is adapted to partially cut gear teeth completely around the blank and to gradually finish these cut gears completely around the blank, thereby avoiding any difference in contour or any warping of the gear blank.

I claim:—

1. A gear cutter comprising a plurality of cutting teeth of gradually increasing height, with the cutting edges of all of said teeth lying in the same plane.

2. A gear cutter comprising a plurality of slanting cutting teeth having acute cutting edges on both sides and at their top, all of such cutting edges lying substantially in one plane.

3. A gear cutter for fashioning herringbone gears comprising a plurality of cutting teeth all of whose cutting edges lie in the same plane.

4. A gear cutter comprising a body portion having a plurality of outwardly projecting cutting teeth each of which is provided with a slanting top and angularly arranged sides, one of said sides having an edge formed by an undercut lip.

5. A gear cutter for fashioning herringbone gears comprising a body portion having a plurality of outwardly projecting cutting teeth with the cutting edges of all of the teeth lying in substantially the same plane having their bases lying in a straight line and their tops lying in a line at an angle to said first mentioned line for a portion of the extent of said cutter, and having their tops lying in a line substantially parallel to said first mentioned line for the remainder of the extent of said cutter.

6. A cutter for fashioning the teeth of double helical gears comprising a body portion having a plurality of outwardly projecting teeth arranged at an angle with their tops slanting downwardly towards the body from the top cutting edge, each tooth having an acute cutting edge on one side formed by the planes of the side and face of the tooth and having a kerf cut into its face to provide an acute cutting edge at the other side of the tooth.

7. A cutter for fashioning the teeth of helical gears comprising a body portion having a plurality of outwardly projecting teeth arranged at an angle with all of their cutting edges arranged in substantially the same plane, the thickness of corresponding portions of certain of the teeth gradually decreasing as one end of the cutter is approached.

8. A cutter for fashioning the teeth of double helical gears comprising a body portion having a plurality of outwardly projecting teeth arranged at an angle with their tops slanting downwardly towards the body from the top cutting edge, each tooth having an acute cutting edge on one side formed by the planes of the side and face of the tooth and having a kerf cut into its face to provide an acute cutting edge at the other side of the tooth, the height of certain of said teeth gradually decreasing towards one end of said cutter.

In testimony that I claim the foregoing I have hereunto set my hand at Milwaukee, in the county of Milwaukee and State of Wisconsin.

FRANK W. JURY.